United States Patent
Funada

(10) Patent No.: US 9,622,154 B2
(45) Date of Patent: Apr. 11, 2017

(54) RADIO COMMUNICATION TERMINAL, MOBILE AD HOC NETWORK, AND NETWORK PARTICIPATION METHOD

(71) Applicant: NEC Corporation, Tokyo (JP)

(72) Inventor: Junichi Funada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/386,939

(22) PCT Filed: Mar. 18, 2013

(86) PCT No.: PCT/JP2013/001815
§ 371 (c)(1),
(2) Date: Sep. 22, 2014

(87) PCT Pub. No.: WO2013/140779
PCT Pub. Date: Sep. 26, 2013

(65) Prior Publication Data
US 2015/0043381 A1    Feb. 12, 2015

(30) Foreign Application Priority Data

Mar. 23, 2012 (JP) ................................. 2012-067744

(51) Int. Cl.
*H04W 48/14* (2009.01)
*H04W 16/14* (2009.01)
(Continued)

(52) U.S. Cl.
CPC ........... *H04W 48/14* (2013.01); *H04W 16/14* (2013.01); *H04W 72/02* (2013.01);
(Continued)

(58) Field of Classification Search
CPC ..... H04W 48/14; H04W 16/14; H04W 72/02; H04W 72/0453; H04W 76/02; H04W 76/023; H04W 84/18
See application file for complete search history.

(56) References Cited

U.S. PATENT DOCUMENTS 6,028,853 A * 2/2000 Haartsen ............. H04B 7/2687
370/338
7,813,372 B2 * 10/2010 Yoshida ................ H04W 76/02
370/338
(Continued)

FOREIGN PATENT DOCUMENTS

| JP | 2006-042076 A | 2/2006 |
| JP | 2007-312274 A | 11/2007 |
| JP | 2010-136290 A | 6/2010 |
| JP | 2011-061759 A | 3/2011 |
| WO | WO 2005/060503 A2 | 7/2005 |

OTHER PUBLICATIONS

International Search Report mailed May 7, 2013 in PCT/JP2013/001815 with English-language translation (2 pgs.).
(Continued)

*Primary Examiner* — Chi H Pham
*Assistant Examiner* — Weibin Huang
(74) *Attorney, Agent, or Firm* — Foley & Lardner LLP

(57) ABSTRACT

A mobile ad hoc network including the communication terminals for cognitive radio communication may have a problem that it takes time for the terminal to newly participate in the network. A radio communication terminal already participating in a mobile ad hoc network includes a pulse pilot generating unit which converts a pulse signal having a predetermined pattern into a radio signal and outputs the obtained radio signal at an unused frequency, after participating in the mobile ad hoc network. A radio communication terminal to participate in a mobile ad hoc network includes a pulse pilot checking unit which checks whether any pulse signal having a predetermined pattern exists in a radio signal for each predetermined frequency and performs a participation process for the frequency of each radio signal including the pulse signal, the participation process including inquiring whether the radio communication terminal can participate in the mobile ad hoc network.

5 Claims, 7 Drawing Sheets

(51) Int. Cl.
*H04W 76/02* (2009.01)
*H04W 72/02* (2009.01)
*H04W 72/04* (2009.01)
*H04W 84/18* (2009.01)

(52) U.S. Cl.
CPC ....... *H04W 72/0453* (2013.01); *H04W 76/02* (2013.01); *H04W 84/18* (2013.01)

(56) References Cited

U.S. PATENT DOCUMENTS

| | | | |
|---|---|---|---|
| 2005/0058117 A1* | 3/2005 | Morioka | H04W 16/14 370/346 |
| 2006/0009248 A1* | 1/2006 | Sakamoto | H04W 72/02 455/517 |
| 2010/0232317 A1* | 9/2010 | Jing | H04L 12/2807 370/254 |
| 2011/0273276 A1* | 11/2011 | Minemura | H04W 52/0235 340/10.1 |
| 2011/2732761 | 11/2011 | Minemura et al. | |

OTHER PUBLICATIONS

Partial English Translation of Written Opinion mailed May 7, 2013 in PCT/JP2013/001815 (2 pgs.).
Extended European Search Report mailed Nov. 25, 2015 in related European application No. 13764856.4 (7 pgs.).

\* cited by examiner

RADIO COMMUNICATION TERMINAL, MOBILE AD HOC NETWORK, AND NETWORK PARTICIPATION METHOD

CROSS-REFERENCE TO RELATED APPLICATIONS

This application is a national stage entry application of PCT/JP2013/001815 filed Mar. 18, 2013, which claims priority to Japanese Application No. 2012-067744 filed Mar. 23, 2012, the disclosures of which are both hereby incorporated by reference in their entirety.

TECHNICAL FIELD

The present invention relates to a radio communication terminal, a mobile ad hoc network, and a network participation method, and particularly to a radio communication terminal for cognitive radio communication, a mobile ad hoc network, and a network participation method.

BACKGROUND ART

Mobile ad hoc network is known which is a network formed by only a number of communication terminals performing radio communications, and, in the mobile ad hoc network, autonomous decentralized communication terminals each having similar functions to a router relay communications. When a communication terminal of the mobile ad hoc network (referred to as a "network" below) is to newly participate in the network, the terminal sequentially inquires of the network, for each of all predetermined frequencies assumed to be used by the network, whether the terminal can participate in the network (referred to as a "participation process" below). Through this process, the communication terminal can identify a frequency used by the network to participate in, allowing the terminal to participate in the network. Since a network to participate in generally uses one or a small number of frequencies, communication terminals can participate in the network without taking much time.

Meanwhile, cognitive radio communication is known in which, unused, usable frequency or frequencies are detected from among various frequencies, and communications are performed using any of the detected frequencies. Since unused, usable frequencies change in time, communication terminals for cognitive radio communication perform communications while dynamically changing setting of a frequency to use, radio modulation mode and access method, and the like.

Patent Literature 1 given below discloses a communication terminal for cognitive radio communication. The communication terminal according to Patent Literature 1 includes an interference wave detecting unit and a control unit. The interference wave detecting unit detects, from a received signal including an interference wave, the level and frequency information of the interference wave in a demodulation path. Based on the level and frequency information of the interference wave detected by the interference wave detecting unit, the control unit controls the circuit characteristics of the demodulation path, and based on the level and frequency information of the interference wave detected, also selects a frequency with little influence of the interference wave, as a frequency to use.

With the above-described configurations and operations, the communication terminal according to Patent Literature 1 detects an unused, usable frequency and uses the frequency to enable efficient communication.

CITATION LIST

Patent Literature

Patent Literature 1: Japanese Patent Application Publication No. 2007-312274

SUMMARY OF INVENTION

Technical Problem

However, a mobile ad hoc network formed by communication terminals (each referred to as a "terminal" below) for cognitive radio communication according to Patent Literature 1 has a problem of taking much time for a terminal to newly participate in a network. The reason will be described below.

Firstly, each of the terminals constituting the network performs cognitive radio communication, and hence the network uses various frequencies. Therefore, a terminal which is to newly participate in the network needs to make an inquiry (participation process) to the network for each of the frequencies assumed to be used by the network, i.e., each of all the various frequencies. This participation process takes time, consequently taking time for the terminal to participate in the network. In other words, since the terminal carries out the participation process for each of a significantly large number of frequencies, it takes time for the terminal to participate in the network.

The object of the present invention is to provide a radio communication terminal, a mobile ad hoc network, and a network participation method which solve the above-described problem.

Solution to Problem

To achieve the above-described object, a radio communication terminal according to the present invention includes a pulse pilot checking unit that, to participate in a mobile ad hoc network, checks whether any pulse signal having a predetermined pattern exists in a radio signal, for each predetermined frequency, and performs a participation process for the frequency of each radio signal including the pulse signal, the participation process including inquiring whether the radio communication terminal can participate in the mobile ad hoc network.

To achieve the above-described object, a radio communication terminal according to the present invention includes a pulse pilot generating unit that, after participating in a mobile ad hoc network, converts a pulse signal having a predetermined pattern into a radio signal, and outputs an obtained radio signal at an unused frequency.

To achieve the above-described object, a mobile ad hoc network according to the present invention includes radio communication terminals for cognitive radio communication, wherein a radio communication terminal that is to participate in the mobile ad hoc network is a radio communication terminal including a pulse pilot checking unit that, to participate in a mobile ad hoc network, checks whether any pulse signal having a predetermined pattern exists in a radio signal, for each predetermined frequency, and performs a participation process for the frequency of each radio signal including the pulse signal, the participation process including inquiring whether the radio communication terminal can participate in the mobile ad hoc network, and a radio communication terminal that is already participating in the mobile ad hoc network is a radio communication terminal including a pulse pilot generating unit that converts a pulse signal having a predetermined pattern into a radio signal, and outputs an obtained radio signal at an unused frequency, after participating in a mobile ad hoc network.

To achieve the above-described object, a network participation method according to the present invention is a network participation method of participating in a mobile ad hoc network, the network participation method comprising, to participate in the mobile ad hoc network, checking whether any pulse signal having a predetermined pattern exists in a radio signal, for each predetermined frequency, and performing a participation process for the frequency of each radio signal including the pulse signal, the participation process including inquiring whether participation in the mobile ad hoc network is possible.

Advantageous Effects of Invention

According to the present invention, a communication terminal for cognitive radio communication can reduce time to participate in a network.

DESCRIPTION OF EMBODIMENTS

Next, embodiments of the present invention will be described in detail with reference to the drawings.
[First Embodiment]

Description of Configurations

Figure 1:
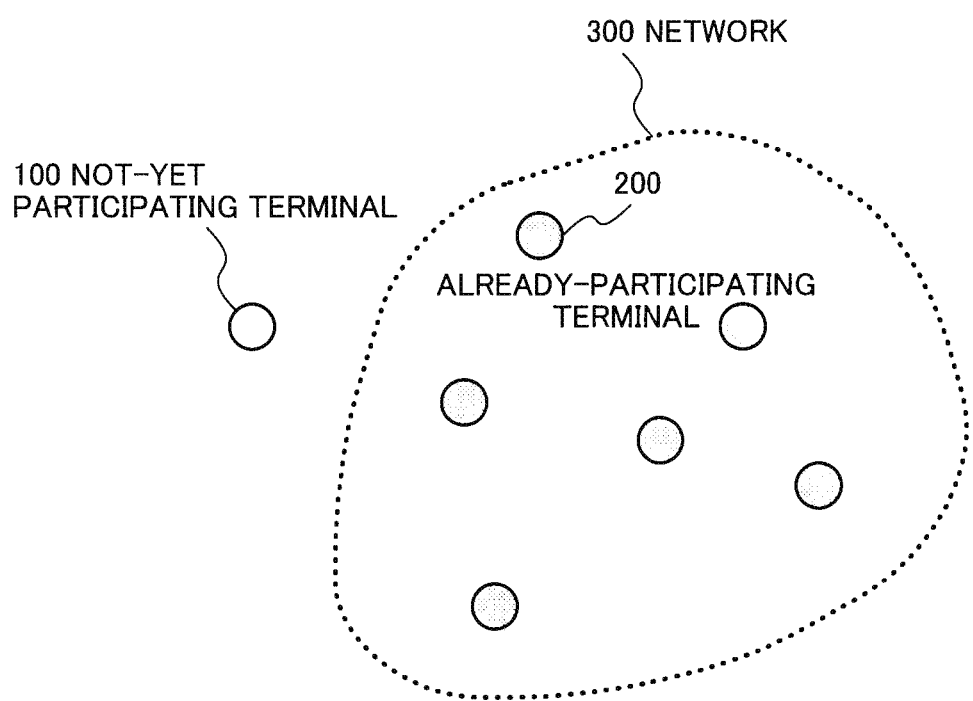
FIG. 1 is a view showing an example of the configuration of a mobile ad hoc network according to a first embodiment of the present invention.
Figure 2:
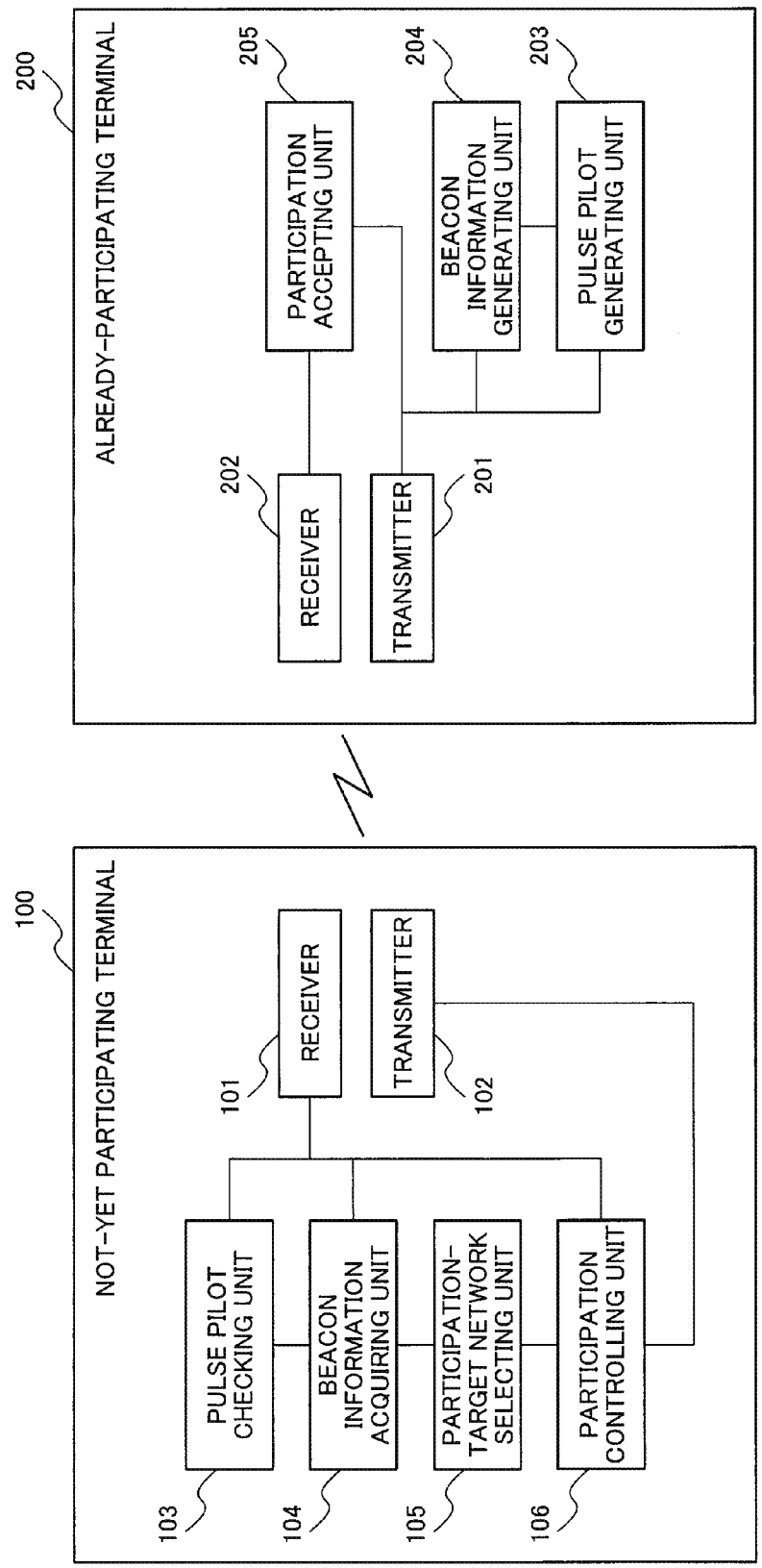
FIG. 2 is a diagram showing an example of the configuration of a not-yet participating terminal 100 and an already-participating terminal 200 which form the mobile ad hoc network according to the first embodiment of the present invention.

FIG. 1 is a view showing an example of the configuration of a mobile ad hoc network according to a first embodiment of the present invention. FIG. 2 is a diagram showing an example of the configuration of each of a not-yet participating terminal 100 and an already-participating terminal 200 which form the mobile ad hoc network according to the first embodiment of the present invention.

(1) Configuration of Mobile Ad Hoc Network According to First Embodiment

As shown in FIG. 1, the mobile ad hoc network according to the first embodiment is formed by a radio communication terminal which is to newly participate in the network (referred to as a "not-yet participating terminal 100" below) and radio communication terminals which are already participating in the network (each referred to as an "already-participating terminal 200" below). The network includes multiple already-participating terminals 200, and the already-participating terminals 200 performing cognitive radio communications with each other form the network.

(2) Configuration and Functions of not-Yet Participating Terminal 100

As shown in FIG. 2, the not-yet participating terminal 100 includes a receiver 101, a transmitter 102, a pulse pilot checking unit 103, a beacon information acquiring unit 104, a participation-target network selecting unit 105, and a participation controlling unit 106.

The receiver 101 is connected to the pulse pilot checking unit 103, the beacon information acquiring unit 104, and the participation controlling unit 106. The beacon information acquiring unit 104 is connected to the pulse pilot checking unit 103 and the participation-target network selecting unit 105. The participation controlling unit 106 is connected to the participation-target network selecting unit 105 and the transmitter 102.

The receiver 101 receives a radio signal at an input frequency, and outputs a signal obtained by performing a known receiving process such as demodulation on the received signal. The transmitter 102 outputs a radio signal obtained by performing a known transmitting process such as modulation at an input frequency on an input signal.

The pulse pilot checking unit 103 outputs a predetermined frequency, and checks whether any pulse pilot exists in a signal input in response to the output. In addition, the pulse pilot checking unit 103 stores the frequency of each signal including a pulse pilot, and outputs the stored frequency when a predetermined condition is met. The pulse pilot will be described later in "(4) Description of Pulse Pilot".

The beacon information acquiring unit 104 outputs the input frequency, and extracts beacon information from a signal input in response to the output. If the extracted beacon information is new, the beacon information acquiring unit 104 stores the beacon information, and outputs the stored beacon information when a predetermined condition is met. The beacon information will be described later in "(5) Description of Beacon Information".

The participation-target network selecting unit 105 determines a network to participate in, based on the input beacon information, and outputs information indicating the determined network and the frequency of the network.

The participation controlling unit 106 identifies a network to participate in, from the input information indicating the network. In addition, the participation controlling unit 106 outputs a signal for requesting participation, to the identified network. Moreover, the participation controlling unit 106 outputs the input frequency. The participation controlling unit 106 also inputs and outputs signals required for exchanging information necessary for the participation.

(3) Configuration of Already-Participating Terminal 200

As shown in FIG. 2, the already-participating terminal 200 includes a transmitter 201, a receiver 202, a pulse pilot generating unit 203, a beacon information generating unit 204, and a participation accepting unit 205. Although not shown in FIG. 2, the already-participating terminal 200 also includes a unit for performing cognitive communication.

The transmitter 201 is connected to the pulse pilot generating unit 203, the beacon information generating unit 204, and the participation accepting unit 205. The receiver 202 is connected to the participation accepting unit 205.

The transmitter 201 outputs a radio signal obtained by performing a known transmitting process such as modulation at an input frequency on an input signal. The receiver 202 outputs a signal obtained by performing a known receiving process such as demodulation at an input frequency on a received radio signal. Each input frequency may be an unused frequency selected by the unit for cognitive communication by using a known function.

The pulse pilot generating unit 203 generates and outputs a predetermined pulse pilot. The pulse pilot will be described later in "(4) Description of Pulse Pilot".

The beacon information generating unit 204 outputs predetermined beacon information to the transmitter 201. The predetermined beacon information is set in the beacon information generating unit 204 by a user of the mobile ad hoc network according to this embodiment. The beacon information will be described later in "(5) Description of Beacon Information".

Upon receipt of a signal requesting participation from the not-yet participating terminal 100, the participation accepting unit 205 outputs a signal required for exchanging information necessary for the participation.

(4) Description of Pulse Pilot

Figure 3:
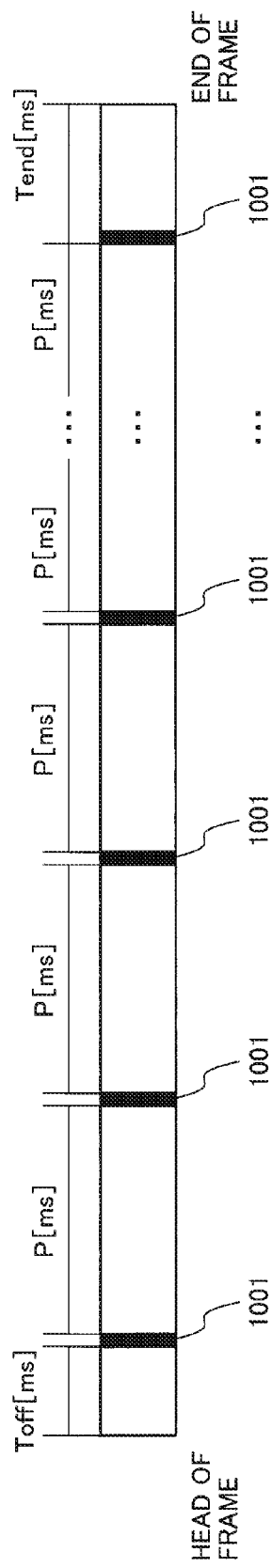
FIG. 3 is a diagram for illustrating a pulse pilot according to the first embodiment of the present invention.

In the following, description will be given of a pulse pilot by using FIG. 3. FIG. 3 is a diagram for illustrating a pulse pilot according to the first embodiment of the present invention.

A pulse pilot is a pulse signal transmitted by the already-participating terminal 200 only for a short period of time in a certain cycle. The pulse signal is a signal having iteration of transmission ON/OFF based on a predetermined rule (referred to as a "signal pattern" below). The predetermined pattern and certain cycle are set in the pulse pilot generating unit 203 of the already-participating terminal 200 by a user of the mobile ad hoc network of this embodiment.

FIG. 3 shows an example in which a pulse pilot 1001 is transmitted for a short period of time in a certain cycle P ms in a large part (e.g., the entire part) of a transmission frame. The not-yet participating terminal 100 can identify a frequency of the network possible to participate in, according to whether any pulse pilot exists.

(5) Description of Beacon Information

Figure 4:
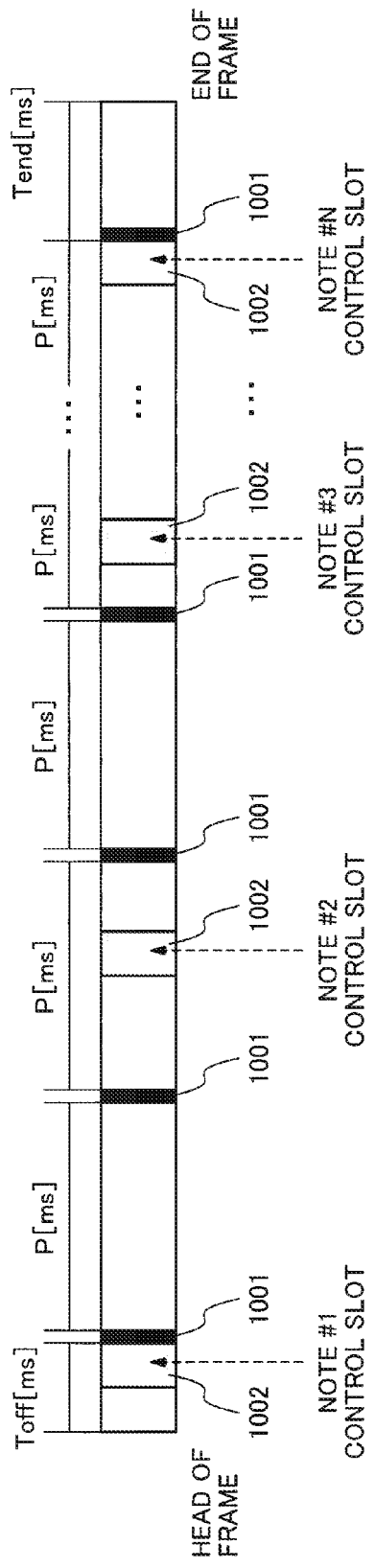
FIG. 4 is a diagram for illustrating beacon information according to the first embodiment of the present invention.

In the following, description will be given of beacon information with reference to FIG. 4. FIG. 4 is a diagram for illustrating beacon information according to the first embodiment of the present invention.

Beacon information is a signal indicating a network and includes information on the characteristics of the network. Information on the characteristics of a network is information indicating the characteristics of the network such as the modulation method used in the network, the number of terminals participating in the network, and information for frame synchronization (timing at which the head of a frame is transmitted), for example. FIG. 4 shows an example of timing at which beacon information is transmitted when the already-participating terminal 200 performs radio communication in a TDMA (Time Division Multiple Access) method. In FIG. 4, beacon information is transmitted in each time slot 1002 (referred to as a "control slot" below) assigned for a control signal to a terminal. The not-yet participating terminal 100 can identify a network possible to be a participation target, by receiving beacon information.

[Description of Operations]

Figure 5:
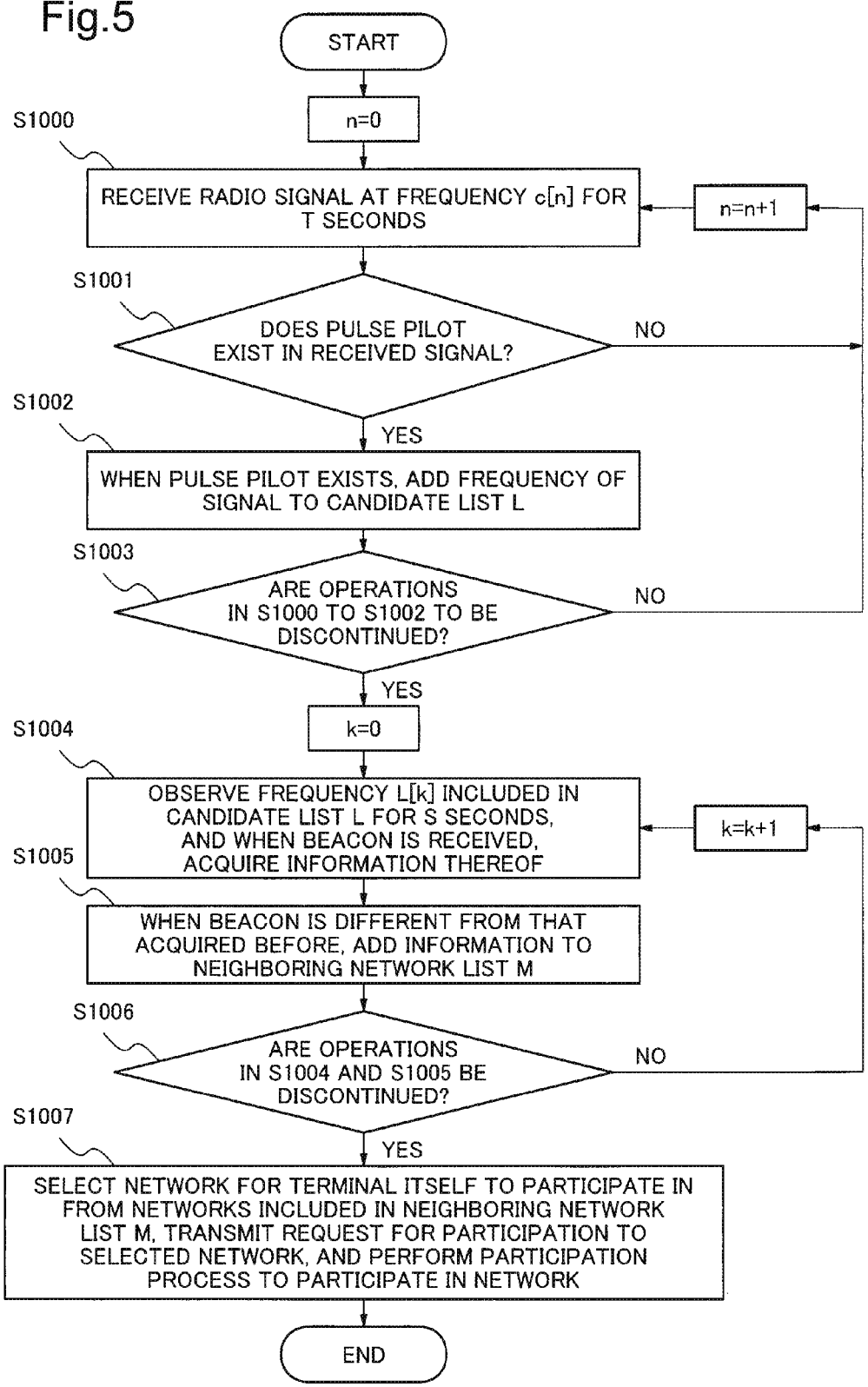
FIG. 5 is a chart showing operations of the not-yet participating terminal 100 according to the first embodiment of the present invention for participating in a network.

FIG. 5 is a chart showing operations of the not-yet participating terminal 100 according to the first embodiment of the present invention for participating in a network. The operations of the not-yet participating terminal 100 of this embodiment for participating in a network will be described below by using FIG. 5. Note that the description is given on the assumption that a pulse pilot and beacon information are cyclically output by the already-participating terminal 200. The operations of the already-participating terminal 200 for outputting a pulse pilot and beacon information will be described later in "(7) Operations of Already-participating Terminal 200 for Outputting Pulse Pilot and Beacon Information".

(6) Operations of not-Yet Participating Terminal 100 for Determining Network to Participate in First, the not-yet participating terminal 100 receives a radio signal for T seconds at one of predetermined frequencies (S1000).

The predetermined frequencies are frequencies likely to be used by the network. At least one frequency is set in advance as the predetermined frequency or frequencies in the pulse pilot checking unit 103 of the not-yet participating terminal 100 by a user of the mobile ad hoc network of this embodiment. In FIG. 5, the one of the predetermined frequencies is designated by C[n]. In addition, the length of T seconds is also set in advance in the receiver 101 of the not-yet participating terminal 100 by a user of the mobile ad hoc network of this embodiment. Note that the user of the mobile ad hoc network of this embodiment is supposed to set the length of T seconds at the length of the cycle of the pulse pilot or longer so that the not-yet participating terminal 100 can acquire a pulse pilot without fail.

Then, the not-yet participating terminal 100 checks whether any pulse pilot exists in the received radio signal (S1001).

For the operations in S1000 and S1001 described above, the pulse pilot checking unit 103 and the receiver 101 of the not-yet participating terminal 100 performs the following operations.

The pulse pilot checking unit 103 outputs one of the predetermined frequencies to the receiver 101. Then, the receiver 101 receives a radio signal for T seconds at the frequency notified by the pulse pilot checking unit 103. The receiver 101 outputs a signal obtained by performing a known receiving process such as demodulation on the received radio signal, to the pulse pilot checking unit 103. The pulse pilot checking unit 103 analyzes the signal received from the receiver 101 by using a known function, and checks whether any pulse pilot exists in the signal. The pulse pilot checking unit 103 checks whether any pulse pilot exists, based on whether a signal based on a rule predetermined for a pulse pilot (e.g., a predetermined time interval, a predetermined signal pattern, or the like) is included in the received signal.

Then, when a pulse pilot exists, the pulse pilot checking unit 103 of the not-yet participating terminal 100 stores the frequency of the signal by adding the frequency to a candidate list L (S1002).

The candidate list L is a list of the frequencies of signals each including a pulse pilot, and shows candidates of frequencies for which the participation process is to be performed.

Then, the pulse pilot checking unit 103 of the not-yet participating terminal 100 determines whether to discontinue the operations in S1000 to S1002 (S1003).

Specifically, the pulse pilot checking unit 103 determines to discontinue the operations in S1000 to S1002, when the operations in S1000 to S1002 have been performed for all the predetermined frequencies. Alternatively, the pulse pilot checking unit 103 may determine to discontinue the operations in S1000 to S1002, when the number of signals in which a pulse pilot is included reach a certain number. In this case, the certain number is set in advance in the pulse pilot checking unit 103 by a user of the mobile ad hoc network of this embodiment.

Then, when determining to discontinue the operations in S1000 to S1002 (when Yes in S1003), although not illustrated, the pulse pilot checking unit 103 outputs the candidate list L to the beacon information acquiring unit 104. On the other hand, when determining not to discontinue the operations in S1000 to S1002 (when No in S1003), the pulse pilot checking unit 103 performs S1000 to S1002 for any of the frequencies for which S1000 to S1002 have not been performed.

Figure 6:
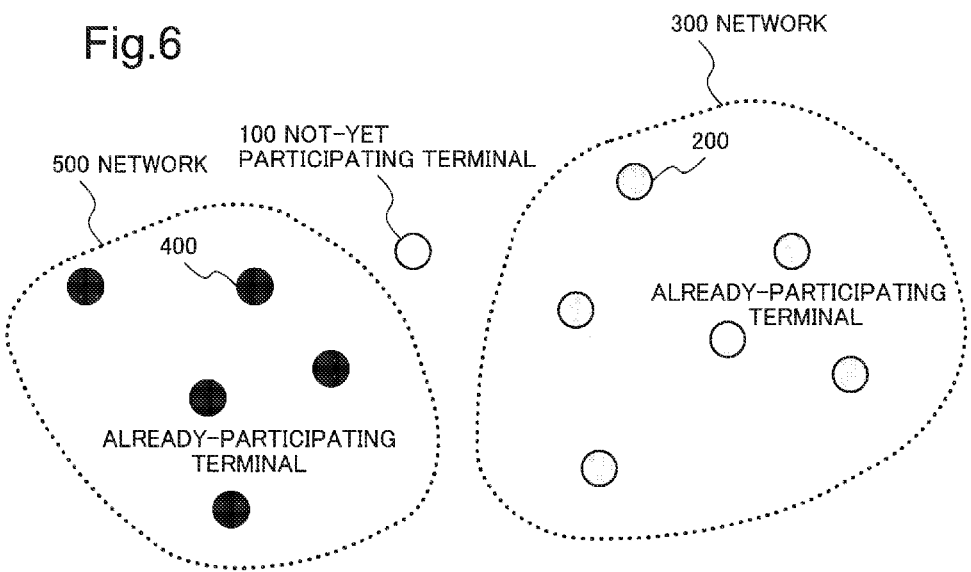
FIG. 6 is a view showing an example of the case in which multiple networks exist near the not-yet participating terminal 100 according to the first embodiment of the present invention.

By the above-described operations, the not-yet participating terminal 100 can identify the frequencies used by a network locating nearby. The not-yet participating terminal 100 may perform the participation process for each of the frequencies in the candidate list L, or may also perform S1004 to be described below. By acquiring beacon information from each network, the not-yet participating terminal 100 can reduce the number of frequencies to perform the participating process, when more than one networks exist near the not-yet participating terminal 100 as in the case shown in FIG. 6. FIG. 6 is a view showing an example of the case in which multiple networks exist near the not-yet participating terminal 100 according to the first embodiment of the present invention. In FIG. 6, a network 300 and a network 500 are illustrated as multiple networks. The network 500 is formed by already-participating terminals 400. Each already-participating terminal 400 has the same configuration and functions as those of the already-participating terminal 200, and performs the same operations as those of the already-participating terminal 200.

First, the not-yet participating terminal 100 receives a radio signal for S seconds at one of the frequencies included in the candidate list L, attempts to receive beacon information, and, when successfully receiving beacon information, acquires the information (S1004). In FIG. 5, the one of the frequencies is denoted by frequency L[k].

To perform the operation in S1004 described above, the beacon information acquiring unit 104 and the receiver 101 of the not-yet participating terminal 100 perform the following operations.

The beacon information acquiring unit 104 outputs one of the frequencies included in the candidate list L, to the receiver 101. Then, the receiver 101 receives a radio signal for S seconds at the frequency notified by the beacon information acquiring unit 104. The receiver 101 outputs a signal obtained by performing a known receiving process such as demodulation on the received radio signal, to the beacon information acquiring unit 104. The beacon information acquiring unit 104 extracts beacon information from the signal received from the receiver 101 by using a known technique.

The length of the S seconds is set in advance in the receiver 101 of the not-yet participating terminal 100 by a user of the mobile ad hoc network of this embodiment. The length of the S seconds is set at time required for acquiring beacon information or longer. For example, when the already-participating terminal 200 transmits beacon information once per frame by using a control slot shown in FIG. 4, the user of this embodiment may set S seconds at the length corresponding to the frame size. This is because the not-yet participating terminal 100 needs to receive at least one frame in order to extract beacon information without fail. Moreover, the beacon information acquiring unit 104 may extract beacon information while receiving the radio signal. In this case, the beacon information acquiring unit 104 can discontinue the reception of the rest of the radio signal at the time when completing the extraction of the beacon information, and then start the operation in S1005 to be described below.

Then, when the extracted beacon information is new beacon information different from any beacon information acquired before, the beacon information acquiring unit 104 of the not-yet participating terminal 100 stores the beacon information by adding the information to a neighboring network list M (S1005). The neighboring network list M is a list including beacon information and the frequencies at which the beacon information has been received.

Then, the beacon information acquiring unit 104 determines, for the frequency included in the candidate list L, whether to discontinue the operations in S1004 and 1005 described above (S1006).

Specifically, the beacon information acquiring unit 104 determines to discontinue the operations in S1004 and S1005, when the beacon information acquiring unit 104 has performed the operations in S1004 and S1005 for all the frequencies included in the candidate list L. Alternatively, the beacon information acquiring unit 104 may determine to discontinue the operations in S1004 and S1005 when a certain number of beacon information items have been acquired. Moreover, the beacon information acquiring unit 104 may determine to discontinue the operations in S1004 and S1005 when the beacon information acquiring unit 104 has performed the operations in S1004 and S1005 for predetermined frequencies. The certain number and the predetermined frequencies are set in the beacon information acquiring unit 104 by a user of the mobile ad hoc network of this embodiment.

Then, when determining to discontinue the operations in S1004 and S1005 (when Yes in S1006), the beacon information acquiring unit 104 outputs the neighboring network list M to the participation-target network selecting unit 105 although not shown. On the other hand, when determining not to discontinue the operations in S1004 and S1005 (when No in S1006), the beacon information acquiring unit 104 performs S1004 and S1005 for any of the frequencies for which the beacon information acquiring unit 104 has not performed S1004 and S1005, among the frequencies included in the candidate list L.

Then, the not-yet participating terminal 100 determines a network to participate in, from the neighboring network list M, outputs a signal for requesting participation to the determined network, and performs the participation process for the frequency of the determined network, thereby participating in the network (S1007).

To perform the operation in S1007 described above, the participation-target network selecting unit 105, the participation controlling unit 106, and the already-participating terminal 200 perform the following operations.

(A) The participation-target network selecting unit 105 obtains the characteristics of each network from the corresponding beacon information included in the neighboring network list M. Examples of the characteristics of a network are:

the frequencies used by the network
the number of error bits
the transmission capacity of the network (the maximum design value)
the transmission capacity of the network at the current time
the reception level of a pulse pilot signal from each network
the number of participating terminals
the modulation method used by the network
the geographical distribution of the terminals participating in the network and the like.

(B) The participation-target network selecting unit 105 determines, as a participation-target network, a network having the characteristics described above in (A) which satisfy a predetermined criterion. The predetermined criterion is set in the participation-target network selecting unit 105 by a user of the mobile ad hoc network of this embodiment. For example, the user of the mobile ad hoc network of this embodiment may set the predetermined criterion so that the network has the smallest number of error bits. In this case, the participation-target network selecting unit 105 determines the network having the smallest number of error bits, as a network to participate in. The participation-target network selecting unit 105 outputs, to the participation controlling unit 106, the information indicating the determined network and the frequency at which the beacon information of the network has been received (referred to as the "frequency of the network" below).

(C) The participation controlling unit 106 identifies the network to participate in, from the information indicating the network received from the participation-target network selecting unit 105, and outputs to the transmitter 102, the signal for requesting participation in the network (referred to as a "participation requesting signal" below) and the frequency of the network.

(D) The transmitter 102 performs the transmitting process on the participation requesting signal at the frequency received from the participation controlling unit 106, and outputs a signal obtained by performing the transmitting process, as a radio signal, to a radio transmission path.

(E) The receiver 202 of the already-participating terminal 200 outputs a signal obtained by performing a known receiving process such as demodulation on the received radio signal, to the participation accepting unit 205. The participation accepting unit 205 extracts the participation requesting signal from the received signal by using a known function. Thereafter, the participation accepting unit 205 of the already-participating terminal 200 and the participation controlling unit 106 of the not-yet participating terminal 100 exchange information necessary for the participation via the receivers and the transmitters of the terminals, and perform the participation process for the frequency of the network.

(7) Operations of Already-participating Terminal 200 for Outputting Pulse Pilot and Beacon Information The already-participating terminal 200 can cyclically output a pulse pilot and beacon information by performing the following operations.

First, the pilot pulse generating unit 203 outputs a predetermined pulse pilot to the transmitter 201. The transmitter 201 performs a known transmitting process such as modulation on the pulse pilot received from the pulse pilot generating unit 203 at an unused frequency, and outputs the obtained signal as a radio signal to a radio transmission path.

In addition, the beacon information generating unit 204 outputs predetermined beacon information to the transmitter 201. The transmitter 201 performs a known transmitting process such as modulation on the beacon information input by the beacon information generating unit 204 at an unused frequency, and then outputs the obtained signal as a radio signal to a radio transmission path.

Note that the pulse pilot generating unit 203 and the beacon information generating unit 204 may include the functions of the transmitter 201. Specifically, the pulse pilot generating unit 203 may perform a known transmitting process such as modulation on the predetermined pulse slot at an unused frequency, and then output the obtained signal as a radio signal to the radio transmission path. Similarly, the beacon information generating unit 204 may perform a known transmitting process such as modulation on the predetermined beacon information at an unused frequency, and output the obtained signal as a radio signal to the radio transmission path. In addition, a single radio communication terminal may have the functions of both the not-yet participating terminal 100 and the already-participating terminal 200. In this case, the radio communication terminal may check by the participation controlling unit 106 whether the terminal is participating in a network, and operate by using the functions of the already-participating terminal 200 when already participating in a network while operating by using the functions of the not-yet participating terminal 100 when not participating in any network yet.

[Description of Effects]

According to this embodiment, a terminal attempting to participate in a network can reduce time for participating in the network.

The reasons are as follows. A terminal which is to participate in a network checks a pulse pilot output from the network, and identifies the frequency or frequencies used by the network, before performing the participation process. Accordingly, the terminal attempting to participate in the network performs the participation process only for the obtained frequency or frequencies, instead of performing the participation process for all the various frequencies, consequently reducing time for participating in the network. Moreover, the terminal attempting to participate in a network only needs to check whether or not any pulse pilot is included, in order to check a pulse pilot. Accordingly, the terminal does not need to perform, for example, frame synchronization, thereby enabling fast detection of the frequencies of each network locating nearby. Such operation also makes it possible to reduce time for participating in the network.

Furthermore, the terminal attempting to participate in a network acquires beacon information from the network at an obtained frequency, and selects a network suitable for participating in. Accordingly, the terminal attempting to participate in a network performs the participation process only for the frequency or frequencies of the network suitable for participating in, even though more than one networks are locating nearby. This further reduces time for participating in the network.

[Second Embodiment]

Next, a second embodiment of the present invention will be described.

[Description of Configuration]

Figure 7:
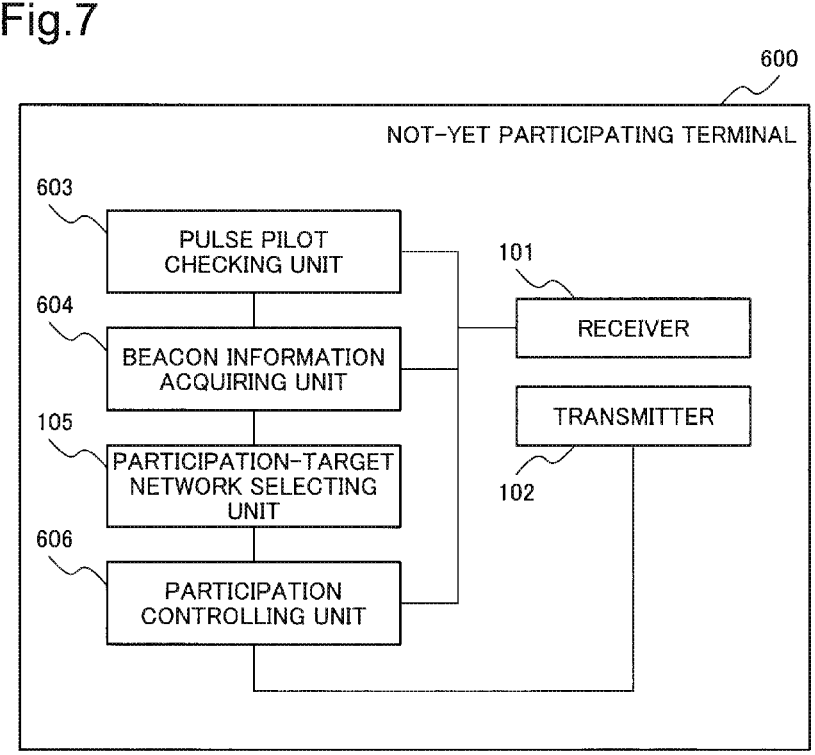
FIG. 7 is a diagram showing an example of the configuration of a not-yet participating terminal 500 forming a mobile ad hoc network according to a second embodiment of the present invention.

FIG. 7 is a diagram showing an example of the configuration of a not-yet participating terminal 600 forming a mobile ad hoc network according to a second embodiment of the present invention. As shown in FIG. 7, the not-yet participating terminal 600 according to the second embodiment includes a pulse pilot checking unit 603, a beacon information acquiring unit 604, and a participation controlling unit 606, instead of the pulse pilot checking unit 103, the beacon information acquiring unit 104, and the participation controlling unit 106.

The pulse pilot checking unit 603 sequentially outputs the frequencies included in the candidate list L and checks, for each signal consequently input, whether any pulse pilot exists, the output and the check being performed iteratively, in the period from the reception of a start instructing signal to the reception of a termination instructing signal. When a frequency no longer including a pulse pilot is found in the period from the reception of the start instructing signal to the reception of the termination instructing signal, the pulse pilot checking unit 603 outputs a signal corresponding to the frequency and a process stop signal.

The beacon information acquiring unit 604 outputs a start instructing signal upon receipt of the candidate list L, and, after determining a network to participate in, outputs a termination instructing signal. When the signal corresponding to the frequency and the process stop signal are input, the beacon information acquiring unit 604 stops extracting beacon information for the frequency indicated by the signal corresponding to the frequency.

The participation controlling unit 606 outputs a start instructing signal at the start of the participation process, and outputs a termination instructing signal at the completion of the participation process. Upon receipt of a signal corresponding to a frequency and a process stop signal, the participation controlling unit 606 stops performing the participation process for the frequency indicated by the signal corresponding to the frequency.

Note that the configurations and functions other than those described above are the same as those of a radio communication system to which the radio communication terminal according to the first embodiment is applied, and are hence denoted by the same numerals and description is omitted.

[Description of Operations]

The radio communication terminal according to the second embodiment is configured to, when reception of a pulse pilot is stopped due to move of the terminal or the like during acquisition of beacon information or the participation process, discontinue the acquisition of the beacon information or the participation process for the frequency. The operations of the radio communication terminal will be described in the following.

Upon receipt of the candidate list L from the pulse pilot checking unit 603, the beacon information acquiring unit 604 transmits a start instructing signal to the pulse pilot checking unit 603. Upon receipt of the start instructing signal from the beacon information acquiring unit 604, the pulse pilot checking unit 603 performs S1000 and S1001 described above sequentially for the frequencies included in the candidate list L, and checks whether a pulse pilot exists, iteratively. When finding a frequency not including any pulse pilot, the pulse pilot checking unit 603 transmits a signal corresponding to the frequency and a process stop signal to the beacon information acquiring unit 604. Upon receipt of the signal corresponding to the frequency and the process stop signal from the pulse pilot checking unit 603, the beacon information acquiring unit 604 stops performing the operations in S1004 to S1006 for extracting beacon information for the frequency indicated by the input signal corresponding to the frequency. After determining a network to participate in through the operations in S1004 to S1006, the beacon information acquiring unit 604 transmits a termination instructing signal to the pulse pilot checking unit 603. Upon receipt of the termination instructing signal from the beacon information acquiring unit 604, the pulse pilot checking unit 603 terminates the operation for checking whether any pulse pilot exists.

When starting the participation process, the participation controlling unit 606 outputs a start instructing signal to the pulse pilot checking unit 603. Upon receipt of the start instructing signal from the participation controlling unit 606, the pulse pilot checking unit 603 performs the operations in S1000 and S1001 described above, sequentially for the frequencies included in the candidate list L, and checks whether any pulse pilot exists, iteratively. Then, when a frequency not including any pulse pilot is found, the pulse pilot checking unit 603 transmits a signal corresponding to the frequency and a process stop signal to the participation controlling unit 606. Upon receipt of the signal corresponding to the frequency and the process stop signal from the pulse pilot checking unit 603, the participation controlling unit 606 stops performing the participation process for the frequency indicated by the input signal corresponding to the frequency. Then, at the completion of the participation process, the participation controlling unit 606 transmits a termination instructing signal to the pulse pilot checking unit 603. Upon receipt of the termination instructing signal from the participation controlling unit 606, the pulse pilot checking unit 603 terminates the operation for checking whether any pulse pilot exists.

Since the operations other than the above are the same as those in the first embodiment, detailed description is omitted. Note that the radio communication terminal according to the second embodiment may perform the above-described operations only at the time of acquiring beacon information or performing the participation process.

[Description of Effects]

According to the present invention, it is possible to prevent the terminal attempting to participate in a network from performing the participation process and acquiring beacon information when a frequency once recognized as usable turned to be unusable for communication as a result of move or the like. The reason is that the terminal of this embodiment checks whether any pulse pilot still exists for each identified frequency at the time of performing the participation process and acquiring beacon information. When a frequency no longer including any pulse pilot is found as a result of checking, the terminal of this embodiment stops the participation process and the like for the frequency, thus preventing the participation process and the like from being performed unnecessarily.

In addition, the terminal attempting to participate in a network can move on to a different process immediately since the terminal does not perform the participation process and the like for each frequency which is no longer usable for communication. When the different process is, for example, a process for participating in a different network, the terminal can participate in a different network immediately, thus preventing the terminal from taking much time for participating in a network.

[Third Embodiment]

Next, a third embodiment of the present invention will be described.

[Description of Configuration]

Figure 8:
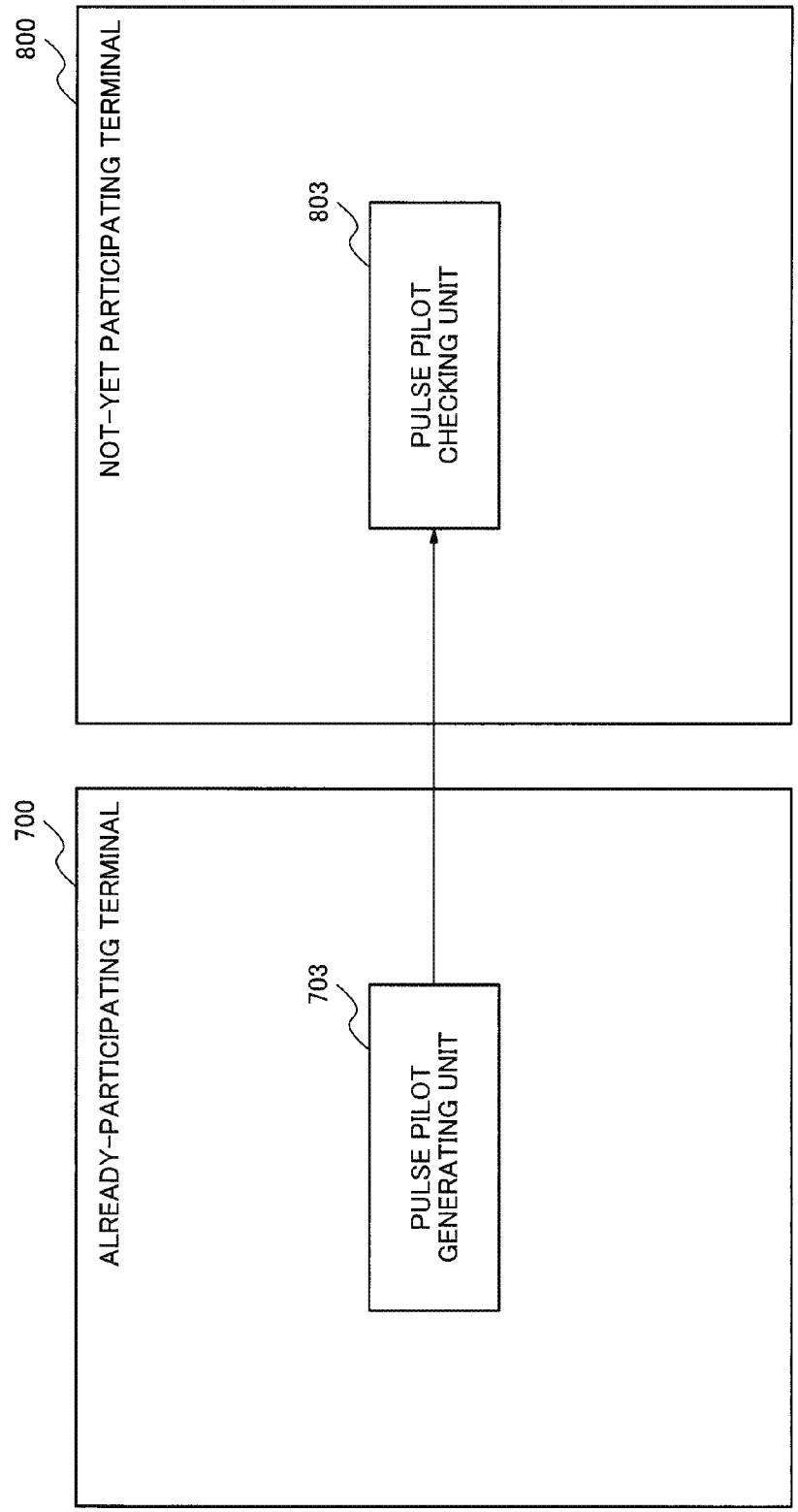
FIG. 8 is a diagram showing an example of the configuration of a mobile ad hoc network according to a third embodiment of the present invention.

FIG. 8 is a diagram showing an example of the configuration of a mobile ad hoc network according to a third embodiment of the present invention. The mobile ad hoc network according to the third embodiment includes an already-participating terminal 700 and a not-yet participating terminal 800. The already-participating terminal 700 is a radio communication terminal which is already participating in the mobile ad hoc network.

The already-participating terminal 700 includes a pulse pilot generating unit 703. After participating in the mobile ad hoc network, the pulse pilot generating unit 703 converts a pulse signal having a predetermined pattern into a radio signal, and outputs the obtained signal at an unused frequency.

The not-yet participating terminal 800 includes a pulse pilot checking unit 803. The pulse pilot checking unit 803 checks whether any pulse signal having the predetermined pattern exists in a radio signal, for each predetermined frequency, at the time of participating in the mobile ad hoc network. The pulse pilot checking unit 803 performs the participation process for the frequency of each radio signal including a pulse signal.

[Description of Operations]

After participating in the mobile ad hoc network, the pulse pilot generating unit 703 of the already-participating terminal 700 converts a pulse signal having the predetermined pattern into a radio signal, and outputs the obtained signal at an unused frequency.

The pulse pilot checking unit 803 of the not-yet participating terminal 800 checks whether any pulse signal having the predetermined pattern exists in a radio signal, for each predetermined frequency, at the time of participating in the mobile ad hoc network. The pulse pilot checking unit 803 performs the participation process for the frequency of each radio signal including a pulse signal.

[Description of Effects]

According to the present invention, the terminal attempting to participate in a mobile ad hoc network identifies the frequencies used by the network, and performs the participation process only for the frequencies, thus being capable of reducing the time for participating in the mobile ad hoc network.

It should be noted that the above-described embodiments are not limited to what has been described above, and various changes can be made to the embodiments in the implementation phase without departing from the gist thereof.

This application is based upon and claims the benefit of priority from Japanese Patent Application No. 2012-067744 filed on Mar. 23, 2012, the disclosure of which is incorporated herein in its entirety by reference.

REFERENCE SIGNS LIST

100 Not-yet participating terminal
101 Receiver
102 Transmitter
103 Pulse pilot checking unit
104 Beacon information acquiring unit
105 Participation-target network selecting unit
106 Participation controlling unit
200 Already-participating terminal
201 Transmitter
202 Receiver
203 Pulse pilot generating unit
204 Beacon information generating unit
205 Participation accepting unit
300 Network
400 Already-participating terminal
500 Network
600 Not-yet participating terminal
603 Pulse pilot checking unit
604 Beacon information acquiring unit
606 Participation controlling unit
700 Already-participating terminal
703 Pulse pilot generating unit
800 Not-yet participating terminal
803 Pulse pilot checking unit
1001 Pulse pilot
1002 Time slot

The invention claimed is:

1. A radio communication terminal comprising:
pulse pilot checking circuitry configured to determine, for each of a plurality of predetermined frequencies, at least one frequency of a radio signal having a pulse signal, the pulse signal including a predetermined pattern;
beacon information acquiring circuitry configured to extract, for the determined at least one frequency of the radio signal, beacon information including a network characteristic of a mobile ad hoc network from the radio signal;
participation-target network selecting circuitry configured to identify the network characteristic of the mobile ad hoc network from the beacon information and determine a mobile ad hoc network with a network characteristic satisfying a predetermined condition; and
participation controlling circuitry configured to participate in the determined mobile ad hoc network.

2. The radio communication terminal according to claim 1, wherein the pulse pilot checking circuitry is configured to:
check, for the determined at least one frequency of the radio signal, that the pulse signal still exists in the radio signal, in the case generating a start instructing signal; and
expire checking whether the pulse signal still exists in the radio signal, in the case generating a termination instructing signal.

3. The radio communication terminal according to claim 1, wherein
the beacon information acquiring circuitry is further configured to generate a list of candidates of at least one of a mobile ad hoc network that the radio communication terminal can participate, based on the determined at least one frequency of the radio signal.

4. A network participation method of participating in a mobile ad hoc network, comprising:
determining, for each of a plurality of predetermined frequencies, at least one frequency of a radio signal having a pulse signal, the pulse signal including a predetermined pattern;
extracting, for the determined at least one frequency of the radio signal, beacon information including a network characteristic of a mobile ad hoc network from the radio signal;
identifying the network characteristic of the mobile ad hoc network from the beacon information;
determining a mobile ad hoc network with a network characteristic satisfying a predetermined condition; and
participating in the determined mobile ad hoc network.

5. A system comprising:
a first radio communication terminal; and
a second radio communication terminal that has participated in a mobile ad hoc network,
wherein the first radio communication terminal comprises:
pulse pilot checking circuitry configured to determine, for each of a plurality of predetermined frequencies, at least one frequency of a radio signal having a pulse signal, the pulse signal including a predetermined pattern;
beacon information acquiring circuitry configured to extract, for the determined at least one frequency of the radio signal, beacon information including a network characteristic of a mobile ad hoc network from the radio signal;

participation-target network selecting circuitry configured to identify the network characteristic of the mobile ad hoc network from the beacon information and determine a mobile ad hoc network with a network characteristic satisfying a predetermined condition; and participation controlling circuitry configured to participate in the determined the mobile ad hoc network, wherein the second radio communication terminal comprises:

a transmitter configured to, after participating in a mobile ad hoc network, convert a pulse signal having a predetermined pattern into a radio signal and output an obtained radio signal at an unused frequency.

* * * * *